Figure 13:
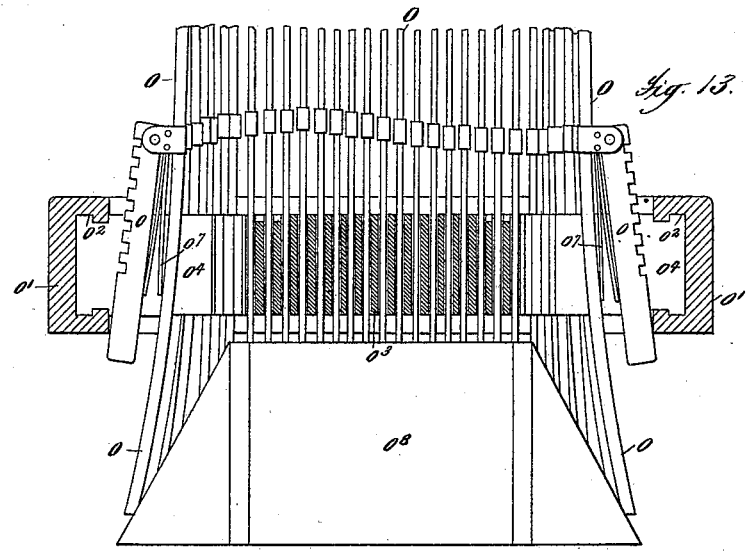

(No Model.) 9 Sheets—Sheet 1.
J. PATTEN.
METHOD OF LASTING BOOTS OR SHOES.
No. 403,068. Patented May 7, 1889.
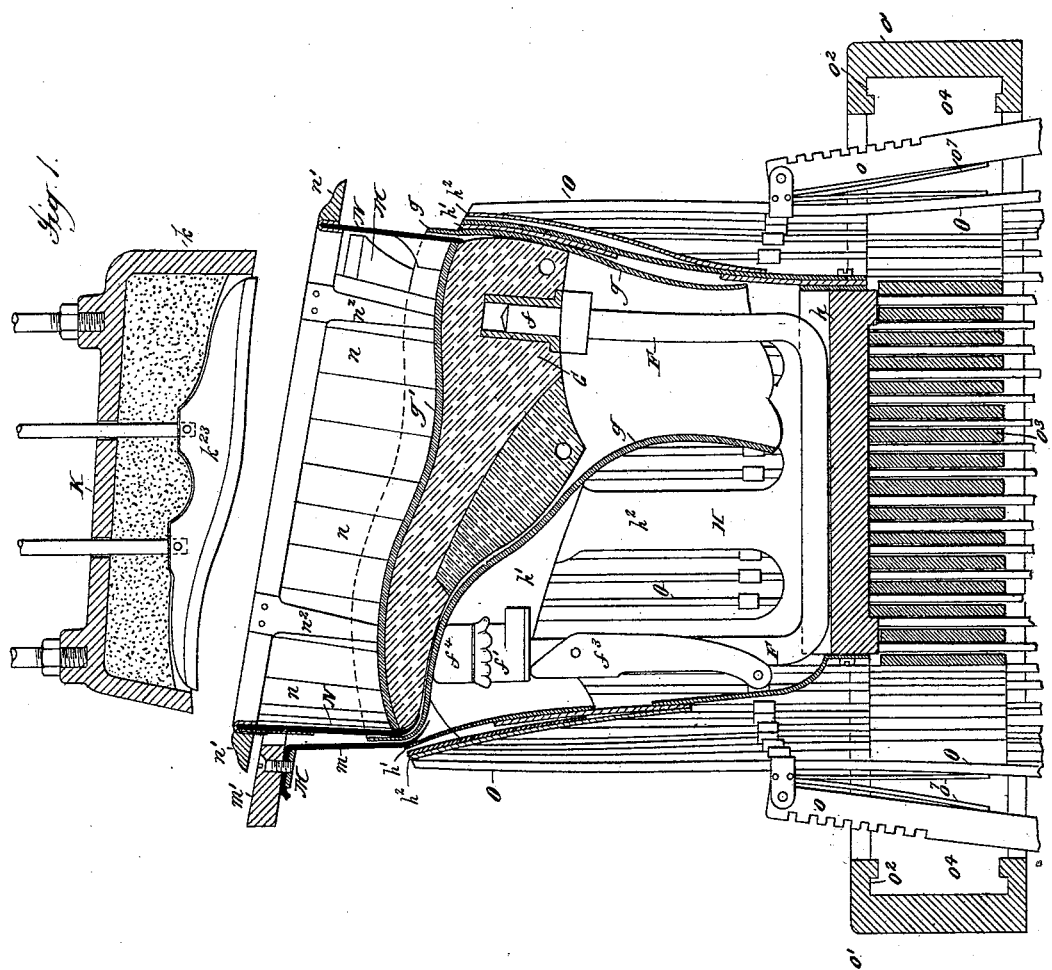
Attest:
Geo. H. Potts.
Edward Wood.
Inventor:
John Patten
By Philip Phelps Hoxey
H. Hys (No Model.) 9 Sheets—Sheet 2.
J. PATTEN.
METHOD OF LASTING BOOTS OR SHOES.
No. 403,068. Patented May 7, 1889.
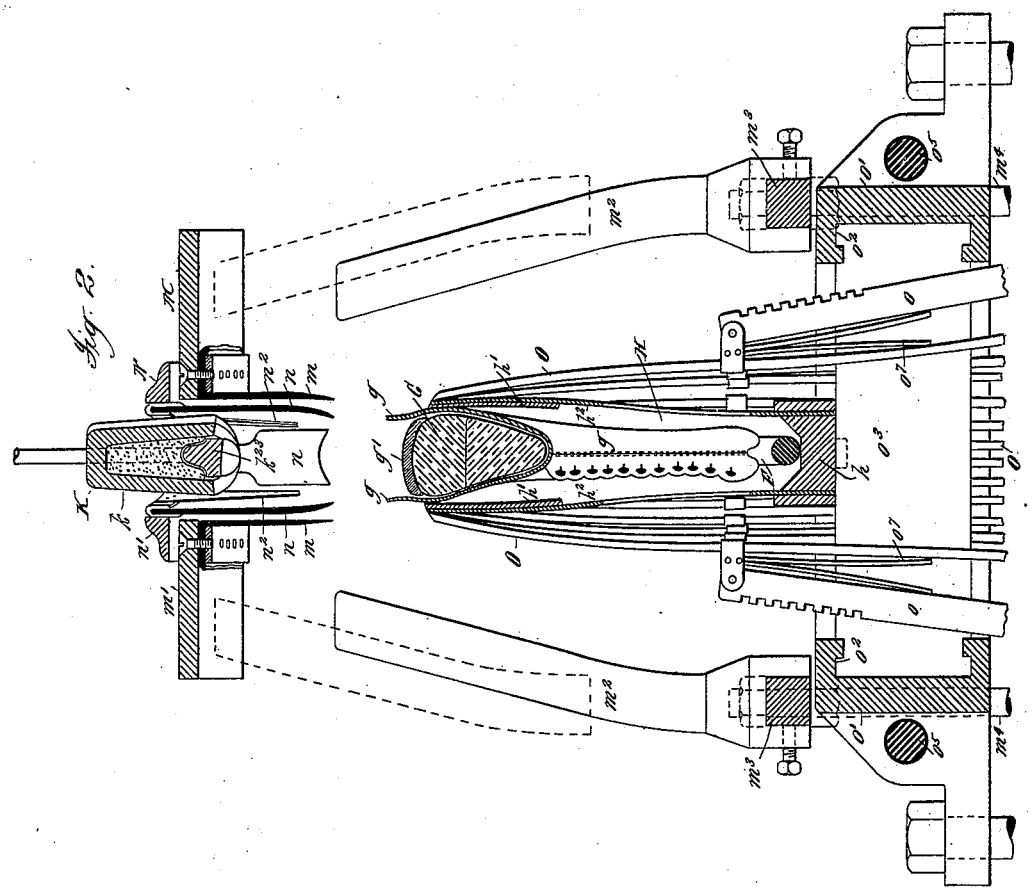

(No Model.) 9 Sheets—Sheet 3.
J. PATTEN.
METHOD OF LASTING BOOTS OR SHOES.
No. 403,068. Patented May 7, 1889.
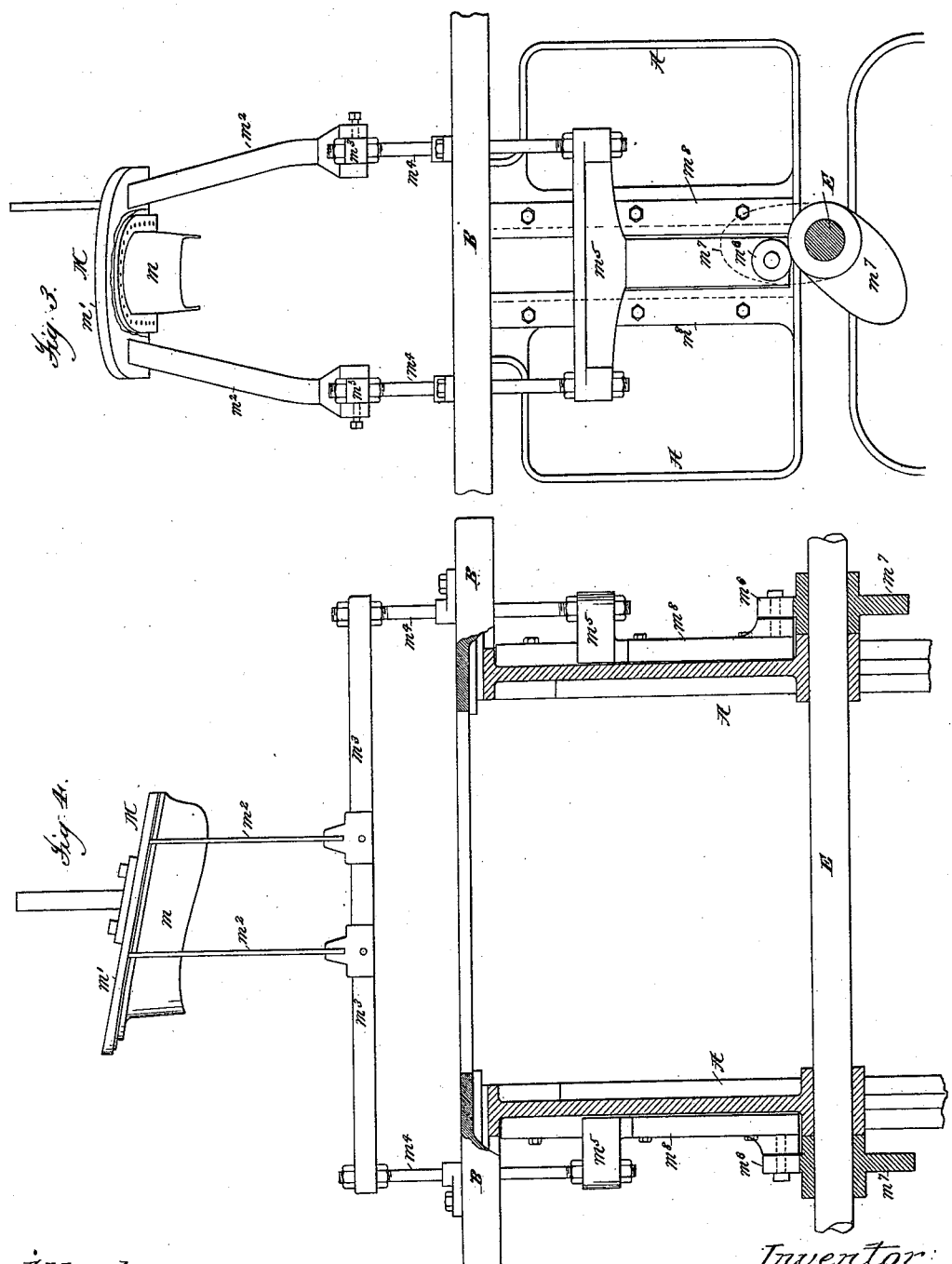

(No Model.) 9 Sheets—Sheet 4.
J. PATTEN.
METHOD OF LASTING BOOTS OR SHOES.
No. 403,068. Patented May 7, 1889.
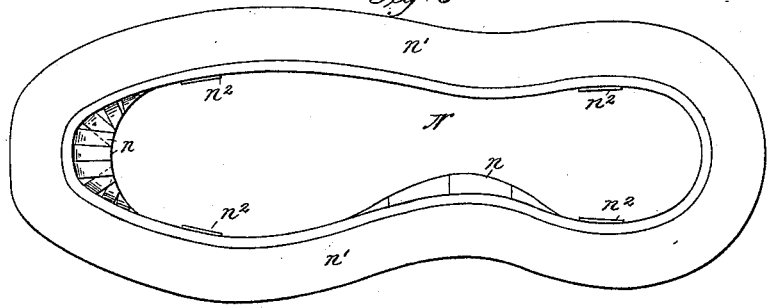
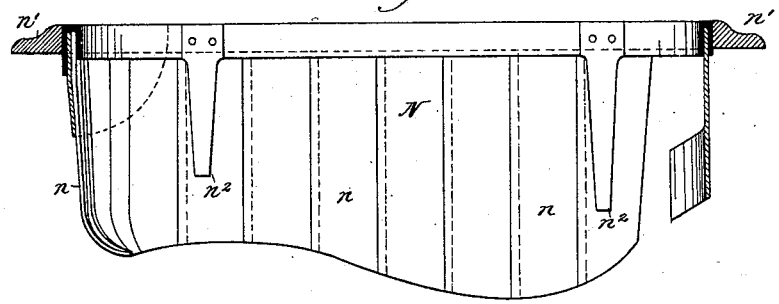
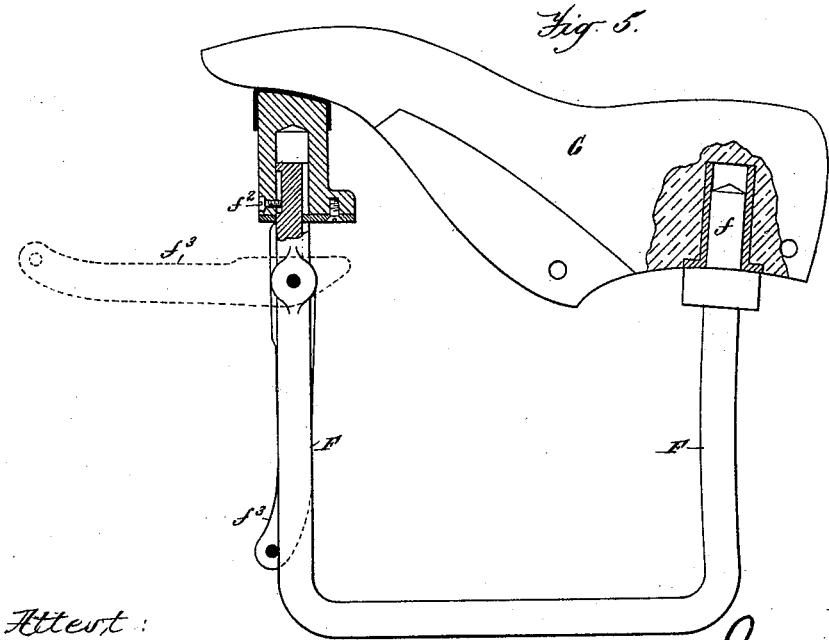

(No Model.)
9 Sheets—Sheet 5.
J. PATTEN.
METHOD OF LASTING BOOTS OR SHOES.
No. 403,068. Patented May 7, 1889.
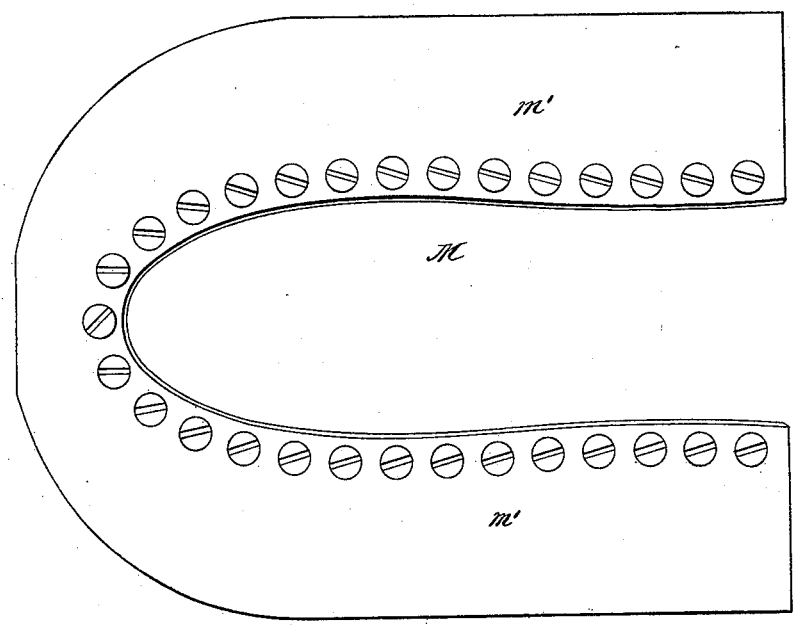
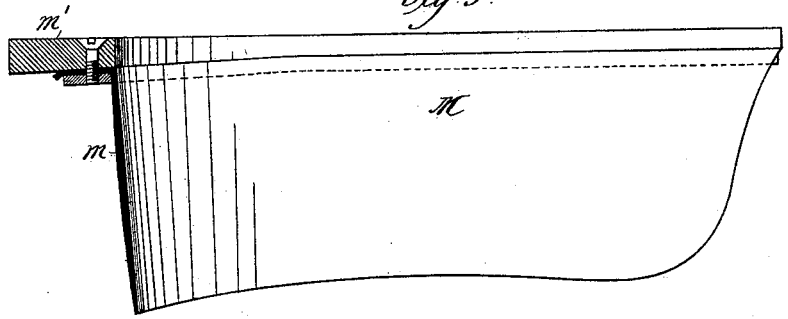

(No Model.) 9 Sheets—Sheet 6.
J. PATTEN.
METHOD OF LASTING BOOTS OR SHOES.
No. 403,068. Patented May 7, 1889.
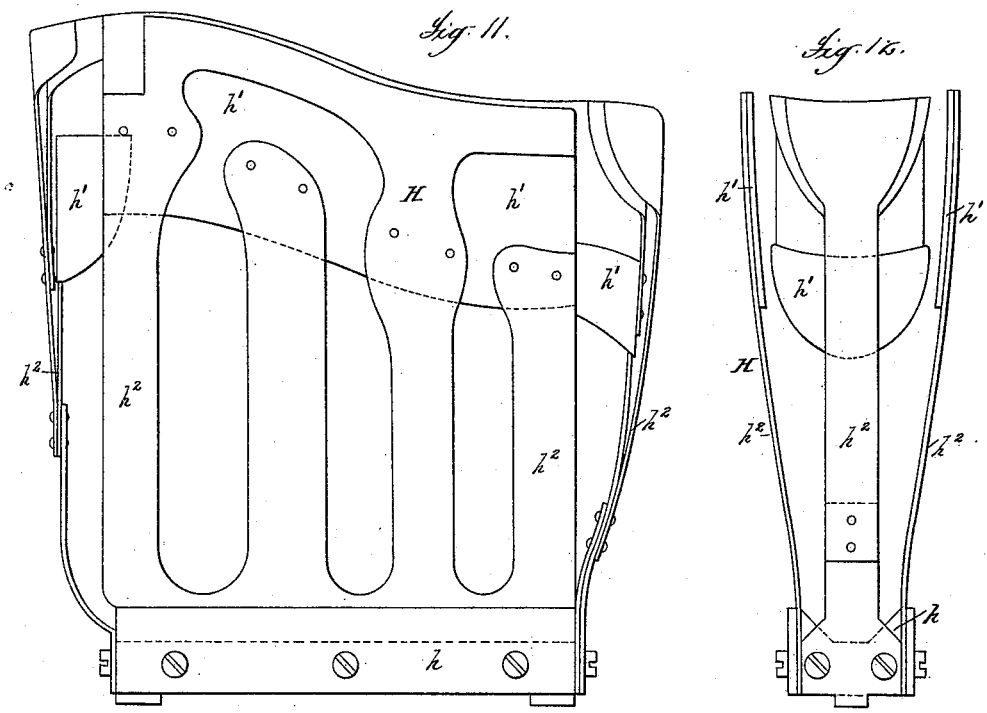
Attest:
Geo. H. Botts.
Edward Wood.
Inventor:
John Patten
By Philip Phelps Hovey
Attys.

(No Model.) 9 Sheets—Sheet 7.

J. PATTEN.
METHOD OF LASTING BOOTS OR SHOES.

No. 403,068. Patented May 7, 1889.

Attest:
G. H. Botts.
Edward Wood

Inventor:
John Patten
By Phelps Phelps & Hoey
Attys (No Model.) 9 Sheets—Sheet 8.
J. PATTEN.
METHOD OF LASTING BOOTS OR SHOES.
No. 403,068. Patented May 7, 1889.
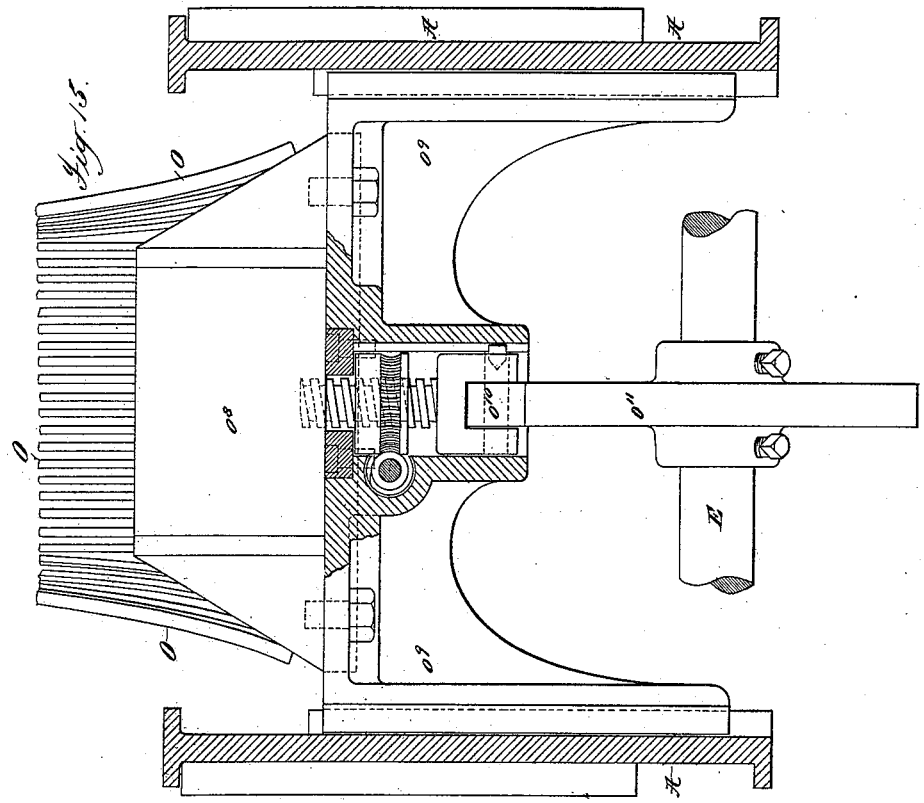
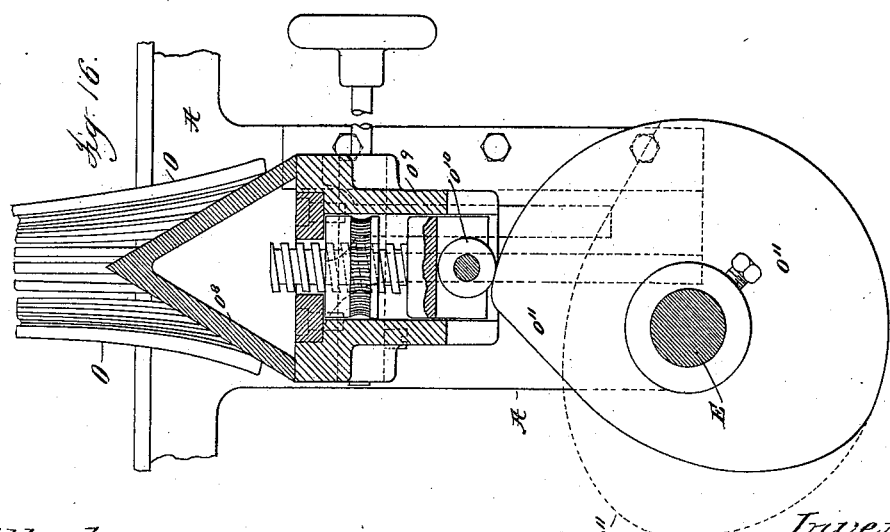
Attest
Geo. H. Botts
Edward Wood.
Inventor.
John Patten
By Philipp Philps & Hoog
Attys (No Model.) 9 Sheets—Sheet 9.
J. PATTEN.
METHOD OF LASTING BOOTS OR SHOES.
No. 403,068. Patented May 7, 1889.
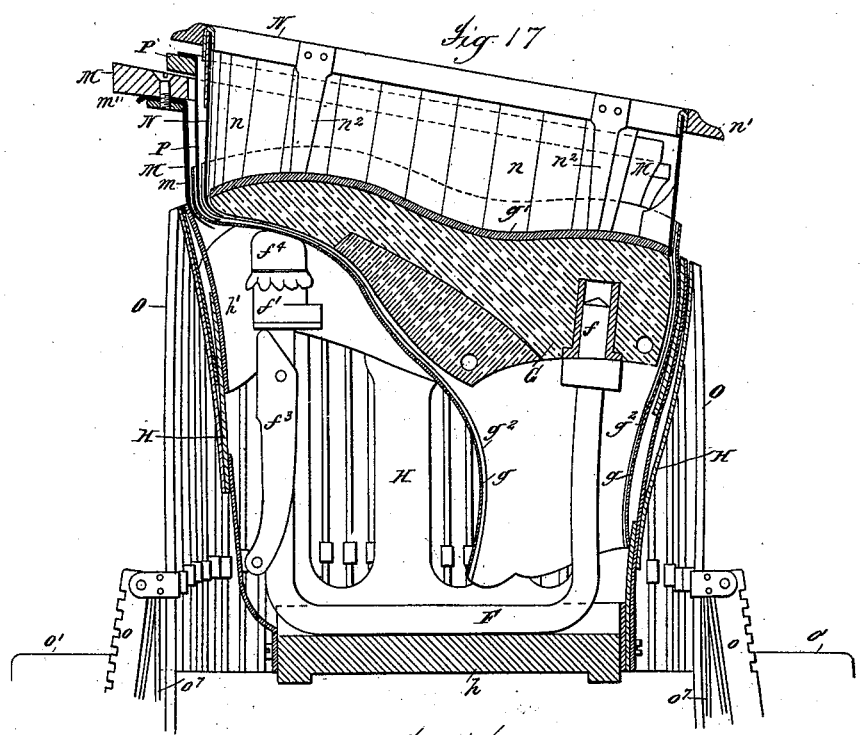
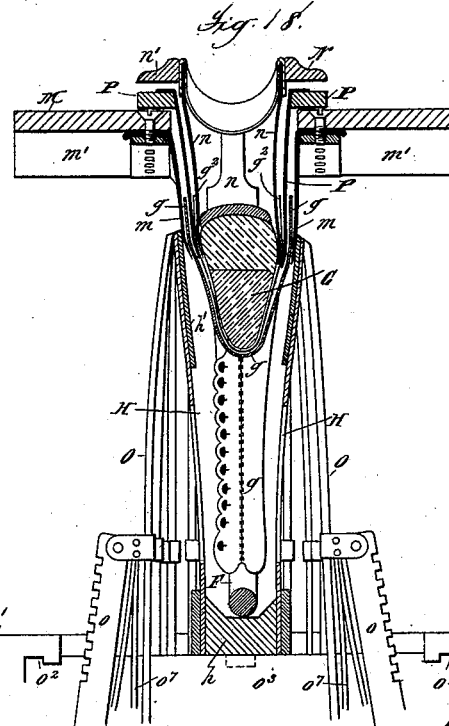

UNITED STATES PATENT OFFICE.

JOHN PATTEN, OF NEW YORK, N. Y.

METHOD OF LASTING BOOTS OR SHOES.

SPECIFICATION forming part of Letters Patent No. 403,068, dated May 7, 1889.

Application filed December 21, 1888. Serial No. 294,301. (No model.)

*To all whom it may concern:*

Be it known that I, JOHN PATTEN, a citizen of the United States, residing at New York, county of New York, and State of New York, have invented certain new and useful Improvements in the Art of Lasting Boots or Shoes, fully described and represented in the following specification and the accompanying drawings, forming a part of the same.

This invention relates to a method or process which is designed, primarily, to effect the stretching of the uppers of boots or shoes in the operation of lasting.

The invention consists in stretching the material acted upon by a rubbing action upon its sides produced by means of yielding flexible surfaces, which are herein for convenience termed "rubbing-stretchers." These rubbing-stretchers are composed of flexible material, and are placed, respectively, upon the opposite surfaces of the material to be stretched. and at a prescribed place grip or pinch the material between them with such prescribed degree of force as may be due to lateral pressure exerted upon the stretchers by pressing instrumentalities, herein called "lateral pressers," which do not partake of the movement of the rubbing-stretchers during the stretching operation, and may therefore be said to be stationary relatively to the movement of the stretchers. The stretching is effected by the movement of the rubbing-stretchers in the desired direction, during which operation the frictional hold of the stretchers upon the material between them, at the place where the lateral pressers exert their pressure upon the stretchers, causes the material between the stretchers to partake to a greater or less degree, depending upon the pressure exerted, of the motion of the stretchers, and thus effects the stretching. The material acted upon, however, remains under tension only until it is advanced beyond the point where the lateral pressure is exerted. As the rubbing-stretchers move, new portions of them are constantly brought under the influence of the lateral pressers, and similarly as the material operated upon moves in obedience to the pulling movement of the stretchers new portions of that are constantly brought within the field of pressure of the lateral pressers. The area of pressure may be enlarged to any required extent, and, when desired, greater pressure may be applied in one place than in another.

The extent to which the material acted upon is stretched depends upon the tightness with which it is pinched between the rubbing-stretchers, and hence those portions of the material which are most tightly pinched will be stretched more than other portions which are less tightly pinched. In the application of this method the last constitutes an abutment which supports the inner stretcher on the line where it is subjected to lateral pressure by the inward thrust which the lateral pressers exert upon the outer stretcher. It will hence be seen that by varying the pressure which the lateral pressers exert at different points the stretching effected upon different parts of the upper will be correspondingly varied.

For the purpose of conveying a full and adequate understanding of the method which constitutes the present invention, it will now be described in connection with a mechanism by which it is applied to the stretching of the uppers of boots or shoes in the operation of lasting.

The mechanism which has been shown forms no part of the present invention, but is herein illustrated merely for the purpose of showing one suitable form of mechanism by which the method can be usefully applied. The method, however, is not limited to the particular form of mechanism herein shown, but may be carried into operation by any suitable form of mechanism for the purpose.

The particular mechanism herein shown forms in part the subject-matter of a companion application for Letters Patent filed in the Patent Office November 27, 1888, Serial No. 292,001.

Figure 14:
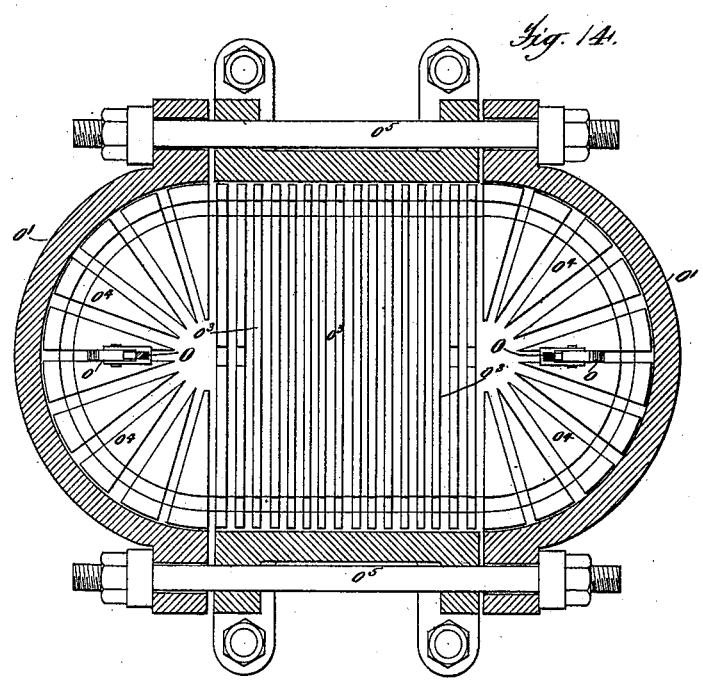

In the accompanying drawings, Figure 1 is a longitudinal vertical section of a part of a lasting-machine, showing stretching instrumentalities operating according to the present method. Fig. 2 is a cross-section of the same parts, showing the parts in different positions. Fig. 3 is an end elevation of the stretching mechanism, upon a reduced scale. Fig. 4 is a side elevation of the same, partly in section. Fig. 5 is a view showing the jack for supporting the last from beneath. Fig. 6 is an enlarged plan view of the inner rubbing-stretcher. Fig. 7 is a longitudinal section of the same. Fig. 8 is an enlarged plan view of the outer rubbing-stretcher. Fig. 9 is a longitudinal section of the same. Fig. 10 is an enlarged plan view of a shield which in some cases may be interposed between the lateral pressers and the outer stretcher. Fig. 11 is a side elevation of the same. Fig. 12 is an end elevation of the same. Fig. 13 is a vertical section of the frame for supporting the lateral pressers, showing also the conical head for operating the pressers. Fig. 14 is a horizontal section of said frame. Fig. 15 is a vertical section showing the means for supporting and operating the head which operates the lateral pressers. Fig. 16 is a cross-section of the same. Figs. 17 and 18 are views similar to Figs. 1 and 2, illustrating an additional stretcher which will in some cases be employed.

Referring to said drawings, it is to be understood that the working parts of the machine therein partly illustrated are supported upon a suitable frame-work, A, the top of which forms a bed-plate, B, for supporting the principal parts of the machine at a convenient height for the operator. The frame-work A affords bearings for a driven shaft, E, from which the movements of the stretching and pressing instrumentalities are derived.

The mechanism for supporting the last and holding it in position during the stretching operation consists of an under support and a downhold. The under support for the last consists of a jack, F, (see Figs. 1, 2, and 5,) which is of a form approximating the letter U. One arm of the jack forms a stud, $f$, which enters an opening formed in the heel of the last G, while the other arm of the jack is provided with a clamp composed of a sliding head, $f'$, which is retained in position by means of a stud, $f^2$, which enters a recess in the arm of the jack and is acted on by a pivoted cam-lever, $f^3$, the end of which engages with the head in such manner as to force it against the toe portion of the last with sufficient pressure to hold the jack in position and also to hold the upper firmly against the last. The end of the head $f'$ which comes into contact with the upper will preferably be provided with a covering of leather or other soft material, $f^4$, which will prevent injury to the upper. The jack is entirely detached from the other parts of the machine, and is placed upon the last after it has been supplied with the upper and before it is introduced into the machine.

The last, covered with the upper and secured to the jack, is introduced into the machine in the position shown in Figs. 1 and 2, where it rests in a seat formed in the base $h$ of the shield H, which will be hereinafter referred to. The downhold K (see Figs. 1 and 2) preferably consists of two members, $k$ and $k^{23}$, the latter of which is seated in a recess in the bottom of the former, and is capable of an independent vertical movement for a purpose that has no relation to the present invention. This downhold is operated in any suitable manner, so as to be depressed onto the bottom of the last at the proper time to hold it against the upward strain of the stretchers, as will be hereinafter explained.

The stretching of the material around the last is accomplished by means of two rubbing-stretchers, which I term an "outer rubbing-stretcher" and an "inner rubbing-stretcher."

The outer stretcher, M, (see Figs. 1, 2, 3, 4, 8, and 9,) consists of a strip of leather or other similar flexible material, $m$, which forms the stretcher proper, and is of a sufficient length to extend around the portions of the last where it is necessary to stretch the upper in the lasting operation. The strip $m$ depends freely from a head-plate, $m'$, which is of approximately U form, the opening in the head being of a shape to conform approximately to the outline of the toe portion of the last as far rearward as it is desired to stretch the upper.

The outer stretcher rests upon the upper ends of vertical standards $m^2$ in such position that the strip $m$ surrounds the toe portion of the last outside the upper. The standards $m^2$ are supported upon horizontal bars $m^3$, which in turn are supported upon rods $m^4$, which pass through openings in the bed-plate B, and are connected to cross-heads $m^5$, which reciprocate in bearings $m^8$ formed in the frame-work A. The cross-heads $m^5$ are provided with bowls $m^6$, which are acted upon by cams $m^7$ upon the shaft E in such manner as to cause the cross-heads and the parts connected therewith, together with the outer stretcher, to make an upward movement at each revolution of the shaft.

The inner rubbing-stretcher, N, (see Figs. 1, 2, 6, and 7) is somewhat similar in construction to the outer stretcher, and, like the outer stretcher, is disconnected from the other parts of the machine. The stretcher proper may consist of a strip of leather or other flexible material secured to a head-plate similar in form to the head-plate of the outer stretcher; but in the application of the method to the lasting of boots or shoes the inner stretcher will preferably, as herein shown, be so constructed as to be applied to the last after it has received the upper and been placed upon the jack and before it is introduced into the machine. For this purpose the stretcher proper is composed in this case of a series of narrow, or comparatively narrow, strips, $n$, of elastic sheet metal, which are secured to and depend from a head-plate, $n'$, having a central opening of proper size to permit the passage through it of the downhold. The strips $n$, forming the inner stretcher proper, are comparatively narrow, and are preferably arranged to overlap each other slightly at their edges, as indicated. These strips are arranged to conform to the outline of the bottom of the last, and are curved inward slightly at their lower ends, so as to fit around the edges of the last inside the upper.

The inner stretcher is applied to the last by springing the lower ends of the metal strips of which it is composed over the edges of the last, so as to introduce them between the last and the upper, as shown in Figs. 1 and 2.

In order to regulate the extent to which the ends of the plates $n$ shall be introduced between the last and the upper, and also to maintain the head-plate $n'$ at the proper distance from the bottom of the last at all points, the head-plate is provided with a number of depending lugs, $n^2$, which project inward slightly so as to rest upon the bottom of the last. The head-plate $n'$ is somewhat wider than the opening in the head-plate $m'$, so that when the two stretchers are in position ready for the stretching operation the head-plates will overlap, so that the raising of the outer stretcher by the action of the cams $m^7$ will also operate to simultaneously raise the inner stretcher.

Co-operating with the stretchers M N, to give said stretchers sufficient frictional hold upon the upper to secure the necessary rubbing action to effect the stretching and also to hold the upper in its stretched condition after the stretching operation and during the subsequent folding operation, and incidentally also to properly center the last beneath the downhold, there are provided lateral pressers which exert a pressure against the sides and around the toe of the last at a point near its bottom during and after the stretching operation. These lateral pressers or pressing instrumentalities may be made in different forms; but in the preferred form, which is illustrated, they are composed of a series of presser-fingers, O, (see Figs. 1, 2, 13, 14, 15, and 16,) which surround the last, with their upper ends in position to deliver pressure against the sides of the last near its bottom. The fingers O are pivoted on adjustable supports $o$, locked in a frame, $o'$, supported upon the bed-plate B. The frame $o'$ is of substantially oval form, and is provided around its inner periphery with a dovetailed recess, $o^2$, into which is fitted, so as to move freely therein, a series of locking plates and blocks, $o^3$ $o^4$, between which the supports $o$ are clamped. The plates $o^3$ extend across from side to side of the frame, while the blocks $o^4$ which are at the ends of the frame are of sector form tapering inward.

For the purpose of locking the supports $o$ in any position to which they are adjusted, the frame $o'$ is made in sections, and is provided with locking bolts and nuts $o^5$, by which the parts of the frame can be drawn together, so as to clamp the plates and blocks $o^3$ $o^4$ and the supports $o$ firmly. By loosening the nuts of the bolts $o^5$ the clamping plates and blocks can be loosened, so as to permit the supports $o$ to be shifted to properly adjust the fingers O. The fingers O extend downward, passing through the spaces between the clamping plates and blocks, in which spaces they move freely, the fingers being slightly thinner than their supports $o$. The fingers are provided with springs $o^7$, located between the fingers and their supports, which operate to normally rock the upper ends of the fingers away from the last.

For the purpose of closing the fingers O, constituting the lateral pressers around the last, to cause them to press the stretchers and the interposed upper against the last, there is provided an oval wedge-shaped head, $o^8$, which is arranged to enter between the lower ends of the fingers O, so as to force them outward and cause their upper ends to be correspondingly forced inward around the last.

The head $o^8$ is mounted upon a vertical reciprocating cross-head, $o^9$, which moves in guideways formed in the frame-work A, and is provided with a bowl, $o^{10}$, which is acted on by a cam, $o^{11}$, upon the shaft E, so that at each revolution of the shaft the head $o^8$ is caused to make an upward movement, thereby causing the presser-fingers to close around the last. The head $o^8$ is provided with means by which it can be adjusted vertically, and is also so constructed that its length can be varied to conform to lasts of different lengths. The particular construction by which these adjustments is accomplished need not be herein specifically described.

In order to prevent any possibility of the upper becoming injured or marred by contact with the lateral pressers after the withdrawal of the stretchers, and also to equalize and distribute the pressure of the fingers of the pressers, it has been found desirable to provide a shield which surrounds the last and is interposed between the pressers and the outer stretcher. This shield is not essential to the successful operation of the method; but it has been found preferable to employ it in most cases, and particularly when operating upon the finer grades of uppers.

The shield H (see Figs. 1, 2, 10, 11, and 12) consists, primarily, of pieces $h'$, of leather or other slightly soft flexible material, which conform in outline to the sides and heel and toe of the last, and are arranged so as to be interposed between the pressers and the outer stretcher during the stretching operation. The pieces $h'$, forming the side and heel and toe portions of the shield, are made independent, and are arranged so as to overlap each other as they are pressed inward and closed around the last. The pieces $h'$, which form the shield proper, are supported upon elastic metal plates $h^2$, which rise from a base, $h$, resting upon the clamping-plates $o^3$. The plates $h^2$ extend nearly or quite to the upper edges of the shield-pieces $h'$, so as to receive the pressure of the presser-fingers and distribute it evenly throughout all portions of the shield-pieces $h'$.

The operation of the mechanism thus constructed is as follows: The last G, of a size to which the machine is adjusted, having been provided with an upper, $g$, and placed upon the jack F, the inner rubbing-stretcher, N, will be placed upon the last, with the ends of the strips $n$ extending between the last and the upper. An outer rubbing-stretcher, M, also of a suitable size to conform to the last, will be placed upon the standards $m^2$, with the lower edge of the strip $m$ projecting downward inside the shield H, and the last, with the jack and the inner stretcher, will be introduced into the shield, so that the upwardly-projecting edge of the upper will lie between the inner and outer stretchers, and the head-plate of the inner stretcher overlap the head-plate of the outer stretcher, as shown in Fig. 1. The shaft E will then be set in motion, so as to move the cam $o^{11}$ from the position shown by dotted lines in Fig. 16 to the position shown by full lines in said figure, thereby raising the head $o^8$, so as to spread the lower ends of the presser-fingers O, as shown in Figs. 13, 15, and 16, and cause the upper ends of said fingers to close around the shield H and press it, together with the inner and outer stretchers and the interposed upper, against the last, as shown in Fig. 2. The insole $g'$ having been placed upon the bottom of the last, the downhold will be lowered onto the insole, so as to hold the last against upward movement during the stretching operation. The shaft E will then be again set in motion, so as to move the cams $m^7$ to the position indicated by dotted lines in Fig. 3, thereby raising the outer and inner stretchers, so as to withdraw them from between the shield and the upper and the upper and last, respectively, as shown in Fig. 2. As the stretchers are thus withdrawn, they exert a rubbing action upon the interposed edge of the upper, which acts to stretch it evenly and smoothly around the last and cause it to properly conform thereto. This rubbing action is due to the friction between the stretchers and the upper, produced by the pressure exerted by the presser-fingers forming the lateral pressers, resisted by the abutment formed by the last. The degree of pressure exerted by the lateral pressers determines the amount of friction between the stretchers and the upper, and consequently the extent to which the upper will be stretched; and this can be regulated and determined by the adjustment of the pressers and the head $o^8$, and also by varying the area over which the pressure of the pressers is distributed. By properly adjusting the fingers of the pressers, greater pressure can be exerted at some points than at others, and thus different portions of the upper can be stretched differently, if necessary, in order to secure proper lasting in any case. As soon as the stretchers are withdrawn the presser-fingers O, which are slightly elastic, spring inward and continue to press the shield against the upper, so as to retain the upper in its stretched condition, with its upwardly-projecting edge extending above the insole, as shown in Fig. 2. The folding over and securing of the upwardly-projecting edge of the upper can then by effected by hand or by any suitable form of mechanism, which it is not necessary to herein describe.

The head-plate of the inner stretcher will preferably be supported at such a height, by the legs $n^2$, or otherwise, that there will be a small amount of lost motion between it and the head-plate of the outer stretcher. When the stretchers are raised, this will allow the outer stretcher to be raised and commence to act upon the material slightly in advance of the inner stretcher, which is found desirable in the application of the method illustrated.

In ordinary applications of the method there are two of the rubbing-stretchers (an inner rubbing-stretcher and an outer rubbing-stretcher) employed, as has been described; but in some cases one of the stretchers (the inner one in the application of the method herein described) may be omitted. This could in some cases be done where the upper had been previously treed, and would not be an entire departure from the present method.

Where material consisting of two or more plies is to be stretched—as, for example, when a boot or shoe upper is provided with a lining or a cap, and particularly in those cases where one of the plies stretches less readily than the other—it is sometimes desirable to employ, in addition to the inner and outer stretchers, an intermediate stretcher, which is located between the inner and outer stretchers and is interposed between the two plies of the material. An organization for carrying out the method in this manner is illustrated in Figs. 17 and 18, in which the upper, $g$, is provided with a lining, $g^2$, and in which there is provided an intermediate stretcher, P, which is located between the outer and inner stretchers, M N, and is interposed between the upper and the lining. The intermediate stretcher is of substantially the same shape as the outer stretcher, but smaller, and may be made up substantially the same as the outer or the inner stretcher.

What I claim is—

1. The herein-described method of stretching the uppers of boots or shoes in lasting by the rubbing action of a moving flexible surface which is pressed laterally toward the toe and sides of the last and against those parts of the upper intervening between said surface and said parts of the last by a plurality of pressing instrumentalities which are stationary relatively to the movement of such surface, substantially as described.

2. The herein-described method of stretching the uppers of boots or shoes in lasting by the rubbing action of moving flexible surfaces which are pressed against the inner and outer sides of the upper to be stretched by instrumentalities which are stationary relatively to the movement of said surfaces, substantially as described.

3. That improvement in the art of lasting boots or shoes which consists in stretching the upper over the last between moving flexible surfaces applied inside and outside of the upper, holding the upper in position after such stretching operation, and folding the edge of the upper over upon the insole and securing the same, substantially as described.

In testimony whereof I have hereunto set my hand in the presence of two subscribing witnesses.

JOHN PATTEN.

Witnesses:
J. J. KENNEDY,
EDWARD WOOD.